Figure 1:
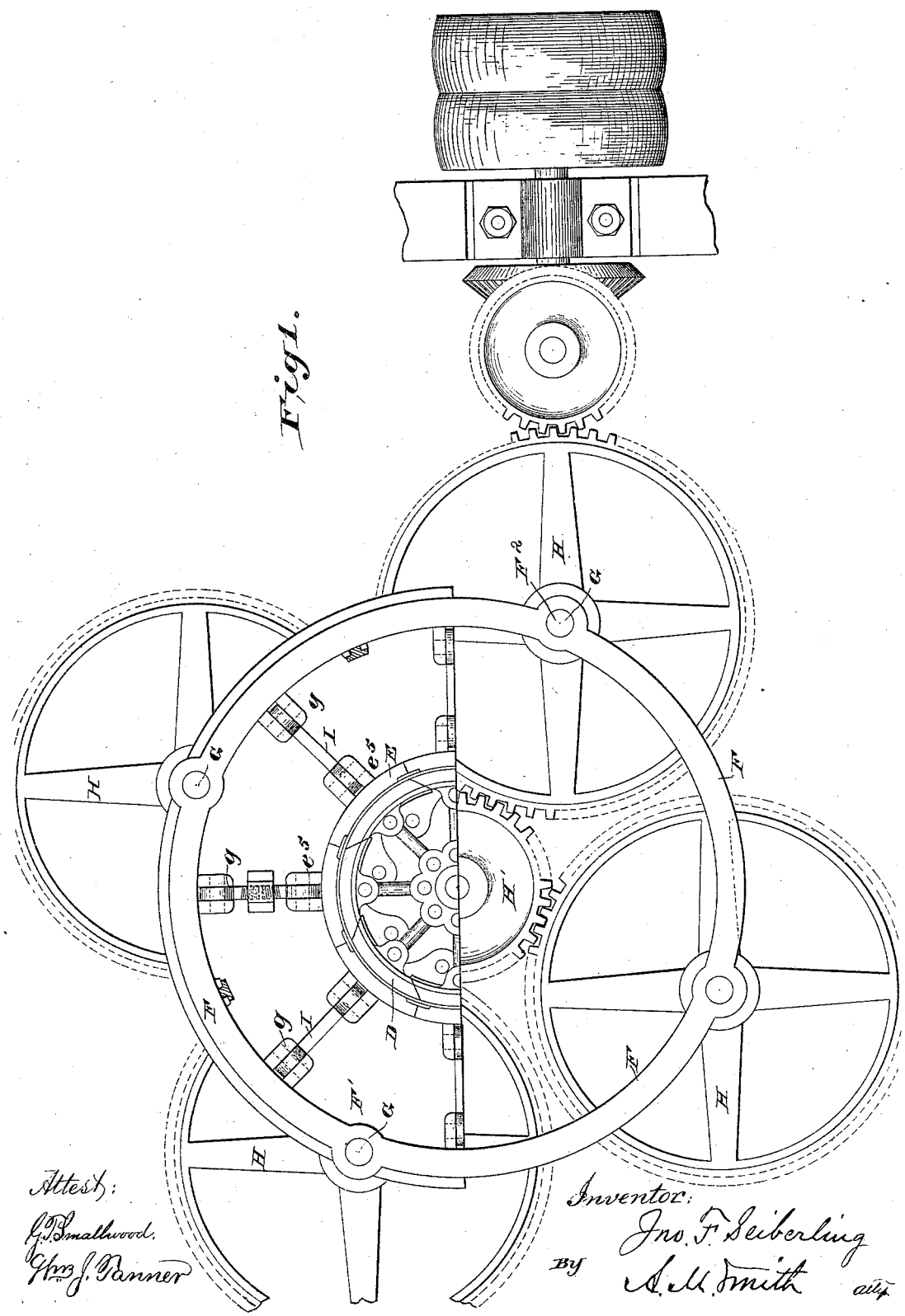

(No Model.)  5 Sheets—Sheet 1.
J. F. SEIBERLING.
MACHINE FOR THE MANUFACTURE OF PAPER BARRELS.
No. 285,847. Patented Oct. 2, 1883.

(No Model.)  
5 Sheets—Sheet 3.

J. F. SEIBERLING.
MACHINE FOR THE MANUFACTURE OF PAPER BARRELS.

No. 285,847.  
Patented Oct. 2, 1883.

Attest.  
Geo. T. Smallwood,  
Wm. J. Panner

Inventor  
Jno. F. Seiberling  
by A. M. Smith  
Atty.

(No Model.)  5 Sheets—Sheet 4.

J. F. SEIBERLING.
MACHINE FOR THE MANUFACTURE OF PAPER BARRELS.

No. 285,847.  Patented Oct. 2, 1883.

Attest:
Geo. T. Smallwood.
Wm. J. Tanner

Inventor
Jno. F. Seiberling,
by A. M. Smith
Atty.

(No Model.) 5 Sheets—Sheet 5.
J. F. SEIBERLING.
MACHINE FOR THE MANUFACTURE OF PAPER BARRELS.
No. 285,847. Patented Oct. 2, 1883.
Fig 7.
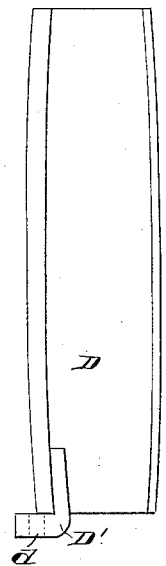
Fig 9.
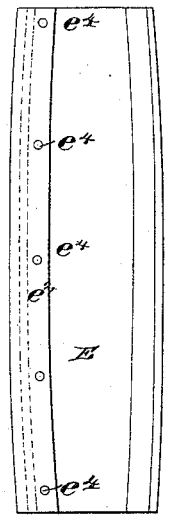
Fig 10.
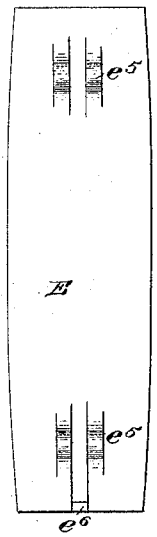
Fig 8.
Fig 11.
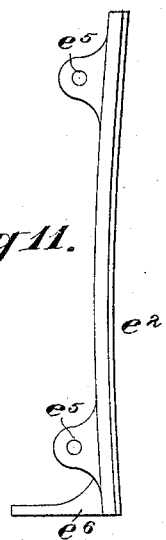
Fig 12.
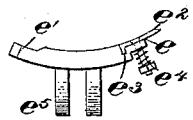
Fig 13.
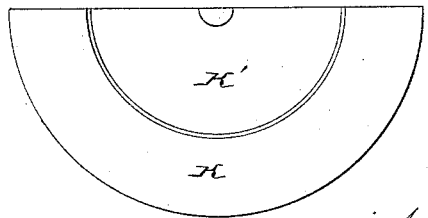
Attest:
Geo. T. Smallwood
Wm. J. Panner
Inventor
Jno. F. Seiberling
by A. M. Smith
atty

UNITED STATES PATENT OFFICE.

JOHN F. SEIBERLING, OF AKRON, OHIO.

MACHINE FOR THE MANUFACTURE OF PAPER BARRELS.

SPECIFICATION forming part of Letters Patent No. 285,847, dated October 2, 1883.

Application filed June 14, 1883. (No model.)

*To all whom it may concern:*

Be it known that I, JOHN F. SEIBERLING, of Akron, county of Summit, and State of Ohio, have invented a new and useful Improvement in Machines for the Manufacture of Paper Barrels, of which the following is a full, clear, and exact description, reference being had to the accompanying drawings, making part of this specification.

My invention relates to an improvement in machines for making barrels or similar vessels from paper-pulp or equivalent material; and it consists in the combination, with adjustable outer presser-boards or staves conformed to the shape of the barrel which is to be formed by their operation upon the pulp interposed between them and inner staves, of two or more annular frames encircling but removed from contact with said staves, and links or intermediate adjustable brace-rods forming a connection between said staves and circular frames, screws for adjusting said frames vertically, and suitable gearing for operating said screws simultaneously, and thereby actuating the circular frames in a vertical direction, either for the purpose of moving the staves or presser-boards inward through the link-connections above referred to, or for withdrawing the staves from their work.

It also consists in the combination, with inner adjustable staves, pivoted in a manner hereinafter described, of a collar or series of arms adapted to move around a central axis, and links interposed between and connecting said staves and collar or arms for rocking the staves on their pivots when said collar is caused to rotate around its axis.

It consists, also, in providing the frame with adjustable guides for directing the movements of the hoops when in operation, in the arrangement of the actuating-screws and gearing, and in certain other details of construction, hereinafter specifically set forth.

Figure 2:
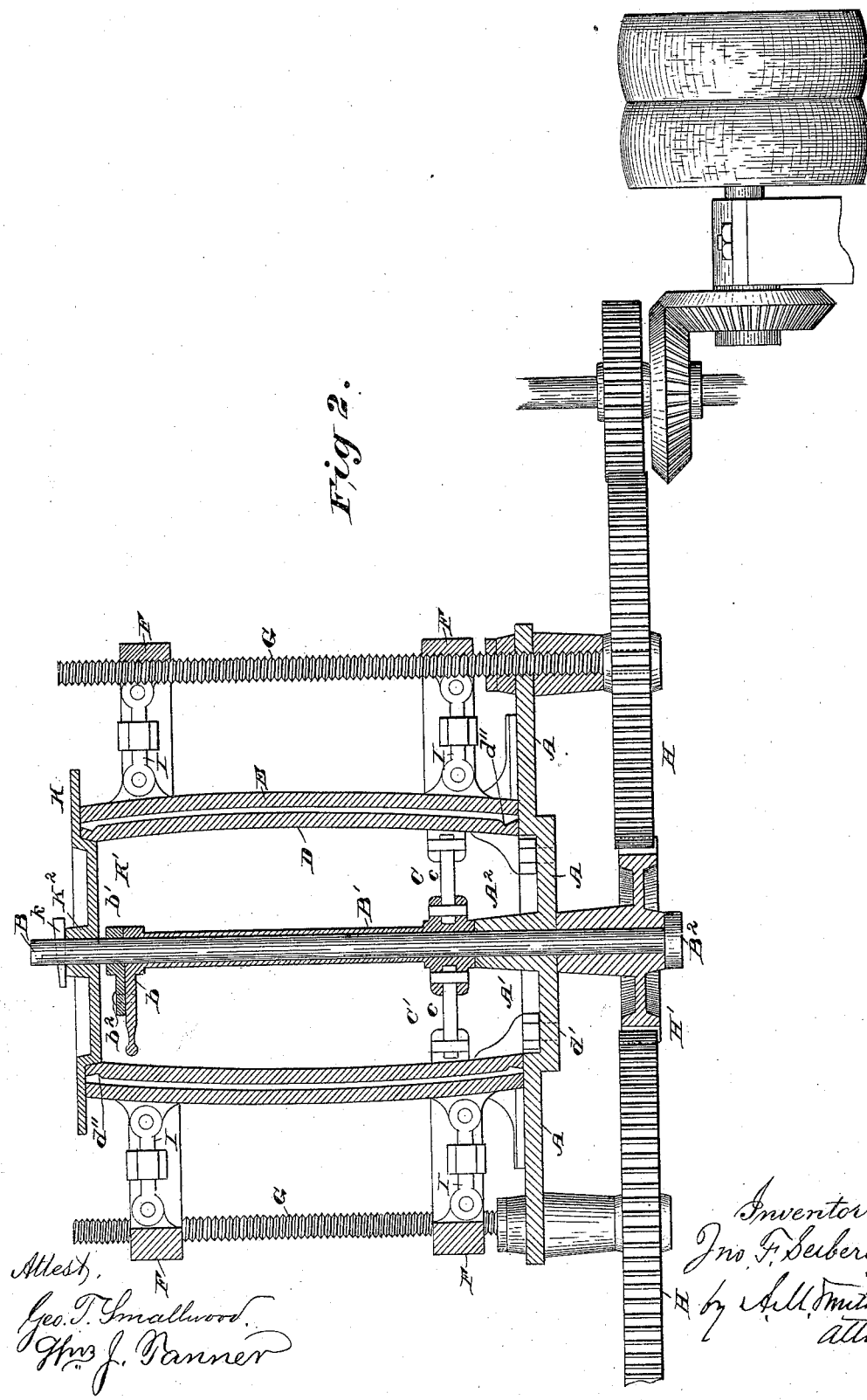
Figure 3:
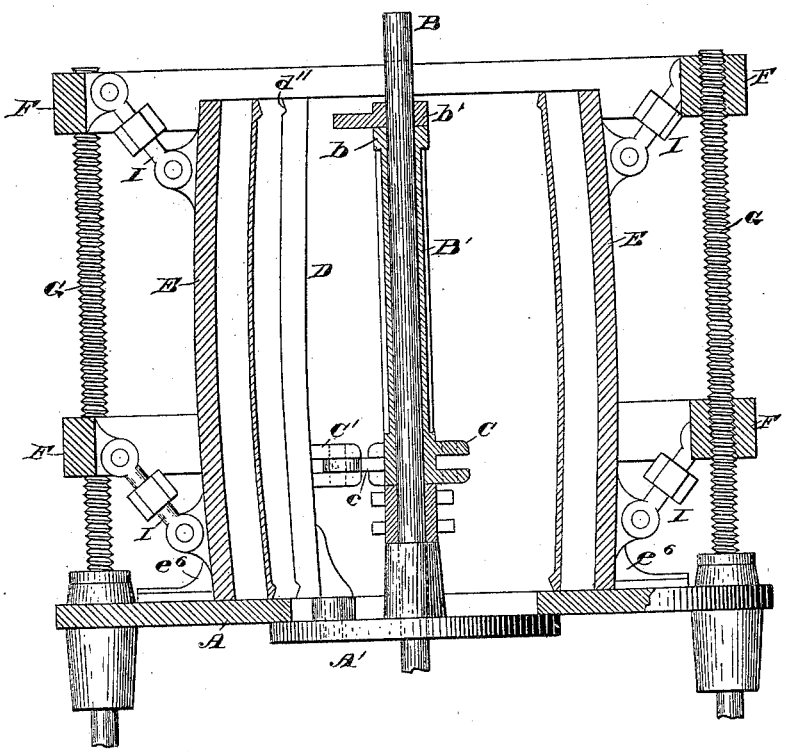
Figure 4:
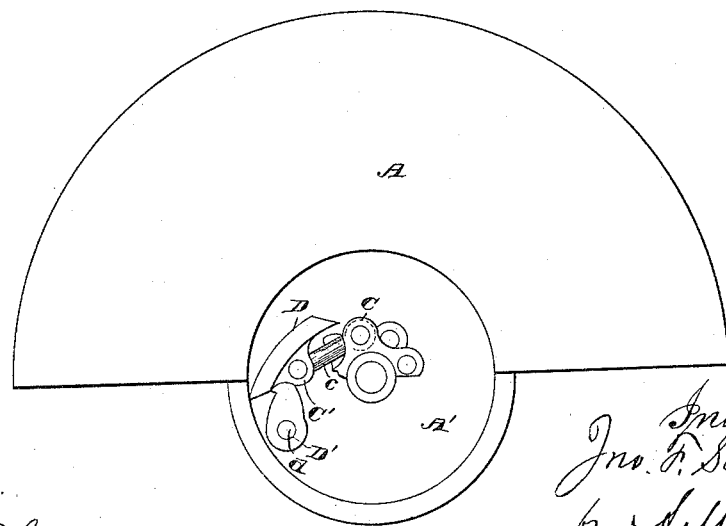
Figure 5:
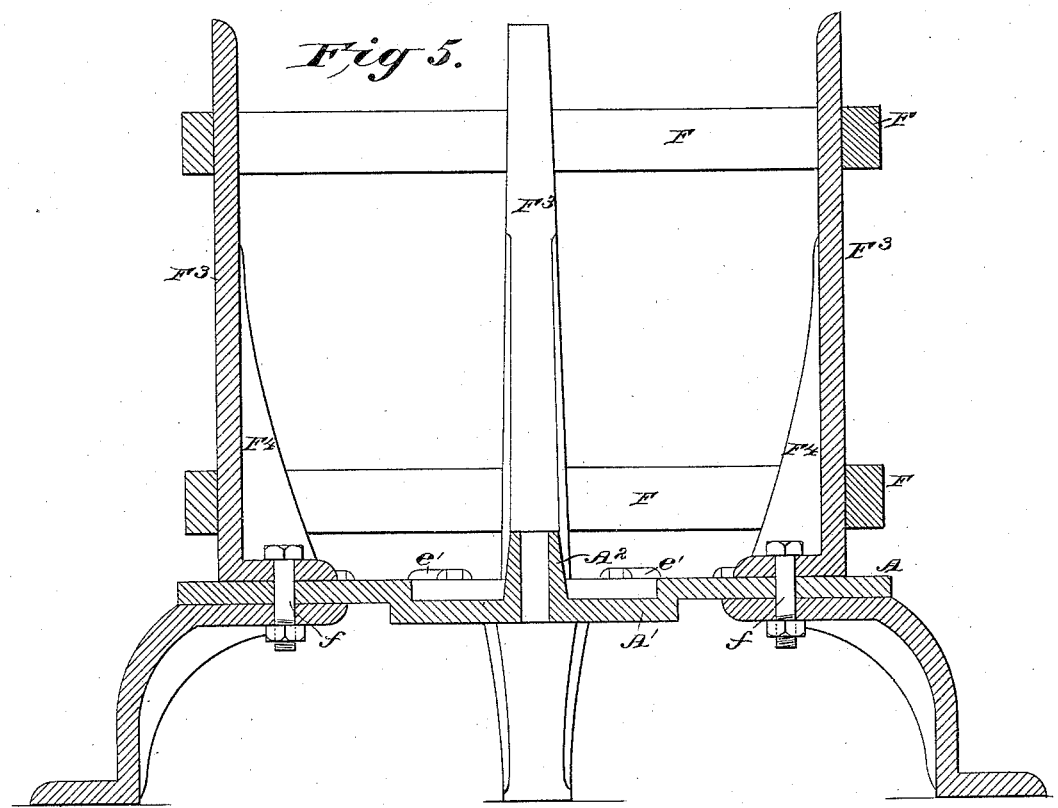
Figure 6:
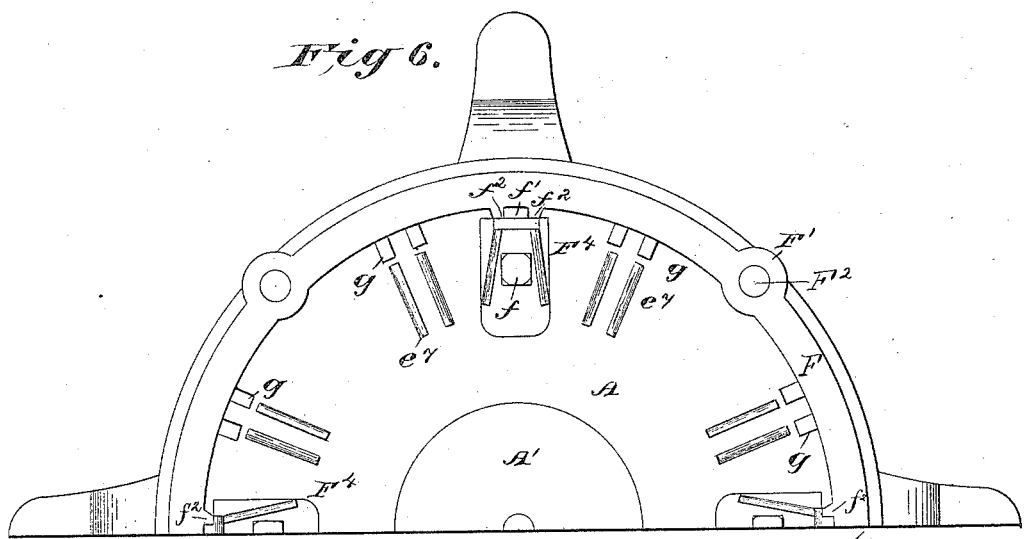

Figure 1 is a plan view of my improvements, partly broken away to show the arrangement of gearing. Fig. 2 is a section view, with the gearing, screws, links, and central axis in elevation. Fig. 3 is a similar section, showing the circular frames elevated and the inner and outer staves withdrawn. Fig. 4 is a plan view of link-connections beetweeen the inner staves and the collar surrounding the central axle, also the manner of pivoting said inner staves. Fig. 5 is a section of the frame of the machine, showing the circular frame-guides. Fig. 6 is a plan view of same, showing the stave-guides. Fig. 7 is an inner face view of one of the inner staves, showing the lug through which said stave is pivoted to the frame. Fig. 8 is a plan view of the same. Fig. 9 is an inner face view of one of the outer staves or presser-boards, showing the joint-covering strip applied thereto. Fig. 10 is an outer face view of the same. Fig. 11 is a side elevation, and Fig. 12 a plan view, of same, showing the manner of attaching the joint-covering strip; and Fig. 13 is a plan view of the top plate.

In the accompanying drawings, A represents the lower or base plate of the machine, provided at A' with an annular recess, and having a central sleeve-bearing for the reception of a stationary shaft or axle, B, as shown in Figs. 2, 3, and 5. Resting upon the shoulder formed by said sleeve, A², and surrounding the stationary shaft, is a collar of sleeve B', adapted to be rotated thereon by means of a hand-lever, b, formed upon said sleeve or rigidly attached thereto, as preferred. The throw of this hand-lever is regulated by means of a circular or semicircular piece, b', having a groove of the desired length in it for the guidance of a pin, b², upon the hand-lever. The piece b' is secured to the stationary shaft, as it is not intended to revolve around the same, and is also supplied for the purpose of holding the sleeve B' in place and preventing displacement of the same.

The sleeve or collar B' is provided on its lower extremity with an enlarged portion, C. as shown in Figs. 1, 2, and 3, having slotted lugs radiating therefrom for the reception of links c, which are pivoted therein. Said links extend to and are also pivoted in similar lugs, C', upon the inner stave, (indicated at D.) The inner staves, D, are provided on their lower extremities and upon their inner side with suitable lugs or ears, D', of the form shown in Figs. 7 and 8, extending below the edge of said staves, within the annular recess A', said lugs being perforated at d, as shown, for the reception of pivots $d'$, upon which the staves are adapted to swing, for a purpose which will be hereinafter explained. The operation of the parts thus far described is as follows: When it is desired to withdraw the staves D from their operative position, (shown clearly in Fig. 2,) the sleeve B' is revolved partly around the stationary shaft B, or as far as the slot in piece $b'$ will allow, by means of the hand-lever $b$, above described. By this part revolution of the sleeve B' and its enlarged portion C, in which are pivoted the links $c$, the inner ends of the latter will be carried or drawn in a similar direction, and through them the staves will be rocked on their pivots, and drawn toward the center of the machine, and away from their operative position into the position shown in Figs. 3 and 4.

Having shown and described the operation of the inner staves, constituting part of my improvement, I now proceed to explain the operation of the outer staves or presser-boards.

E E are the outer staves, and, like the inner ones just described, are made in shape conforming to the shape of the barrel to be formed. In construction, however, they differ materially from the inner staves. They are formed with rabbeted edges, as shown at $e$ and $e'$, Fig. 12, for the reception of strips or plates $e^2$, extending their entire length, for the purpose of making a neat joint, or covering the space which may be left between the edges of the staves when they are pressed inward to their work. It is preferred to form a ledge or flange, $e^3$, upon the inner ends of these plates or strips, adapted to slide in a corresponding groove in the stave, for preventing lateral play of the same; and it is also found desirable to make said plate $e^2$ yielding, which is done by means of extending the retaining-bolt $e^4$ beyond the outer face of the stave, and providing a small spiral spring between the outer face of said stave and a nut upon the end of the bolt $e^4$, whereby said spring exerts its tension to hold the plate $e^2$ against its seat, at the same time allowing the said plate to yield to the pressure of the adjacent stave and adjust itself relatively thereto, thus forming a neat joint between the two adjacent edges of the staves, and preserving the uniformity and evenness of the outer surface of the barrel formed thereby. It is preferred, also, to bevel the edges of the plates $e^2$ upon their outer extremity, as shown in Fig. 12, and also to bevel the edge wall of the rabbet formed in the adjoining stave, into which said plate is intended to fit, so that when the staves have completed their inward movement a vertical groove in form approximating a semicircle remains, and has the effect of forming a longitudinal rib upon the barrel, giving greater strength to the same. Sets of lugs $e^5$ are formed upon the outer faces of the staves E for the reception of links, the purpose of which will be hereinafter explained. The staves E are further provided with feet $e^6$, for the guidance of the same in their inward movement, or when they are retracted, said feet moving between ways $e^7$, formed upon or secured to the base-plate A of the frame of the machine, thus insuring a uniform and positive movement of all the staves, and preventing their displacement or lateral play.

Surrounding the staves E, but removed a considerable distance therefrom, are circular frames or hoops F, of the requisite strength, and by preference of the form shown in Fig. 1, having the enlargement F', containing threaded perforations $F^2$ for the reception of screws, hereinafter referred to. There are by preference two of these circular frames, though one may be sufficient; or more than two may be employed, according to the desire of the manufacturer, and in order to guide and steady their movement, which is vertical only, suitable ways or guiding-posts, $F^3$, of any suitable form, are provided, secured to the base-plate A in any suitable manner; but by preference they are made L-shaped, as shown in Fig. 5, and for giving them greater strength are provided with webs $F^4$, tapering from near the centers of said guide-posts to near the extremity of the feet or their lower horizontal arms. They may be secured to the base-plate by bolts $f$, and the same bolts may also be employed for securing the feet of the machine in place, as shown in Fig. 5. Upon the outer faces of the guiding-posts $F^3$ are projections or rails $f'$, extending their entire length, and the circular frames F are provided at proper intervals with small lugs or ears which straddle said rails or ways, whereby the circular frames in their vertical movement are not permitted to deviate, but are thus made to ascend or descend with a steady movement. Their vertical movement in either an upward or downward direction is effected by means of suitable screws, G, (shown in Figs. 2 and 3,) working in the threaded perforations $F^2$ of the enlargements F' of the circular frames F. I employ four of these screws, as that number produces satisfactory results; but any less or greater number of them may be employed, as may be desired or required. They are all actuated simultaneously through an arrangement of gearing which will be now explained.

Beneath the base-plate A of the machine are arranged four spur-gears, (the number varying according to the number of screws employed,) one for each screw, and fast upon the lower extremity or shank of such screw. The spur-gears (indicated by H) are all of one and the same diameter, and interposed between them on the stationary shaft B, and intermeshing mutually with them all, is a spur-pinion, H', preferably of smaller diameter, held suspended in place by a cylindrical collar, $B^2$, on the shaft B, and revolving around the latter, being loosely mounted thereon, its purpose being merely to operate all the gears simultaneously, when it is itself actuated through its mesh with one of such gears. The latter may be driven in any well-known manner, the method shown in Figs. 1 and 2 being advisable, and forming a neat and compact connection with a driving-pulley. It will be seen, therefore, that by driving one of the spur-wheels H the other is driven simultaneously therewith, and the screws to which said wheels are secured will at the same time be caused to rotate and to elevate or lower the circular frames, according to the direction of rotation of said screws.

As above mentioned, the outer staves or presser-boards are provided with lugs $e^5$, between which are pivoted the inner ends of links I, which have their outer ends similarly pivoted between lugs $g$ on the circular frames.

In Fig. 3 the rings or circular frames F are shown in an elevated position and the outer staves withdrawn from their working position. By operating the screws through the gearing H H' in the proper direction the circular frames will be drawn downward, bringing with them the outer ends of the links I. As the inner ends of the latter always remain in the same plane, or, rather, revolve on pins which travel always in the same horizontal plane, such descent of the circular frames will tend to force the said links into the horizontal positon shown in Fig. 2, thus acting upon the staves E, and causing them to compress the paper-pulp contained between their inner faces and the outer faces of the inner staves, and give to the same the desired form. In Fig. 1, I show means for adjusting the length of the links I, which is done by forming each of the same in two parts, one containing a right and the other a left hand screw-thread, and providing a correspondingly-threaded nut for the reception of the oppositely-threaded ends of the two halves of the links. This is found very necessary to the accurate operation of the machine. The inner staves are by preference provided each with a horizontal V-shaped depression, $d''$, near its ends, which, when the sleeves are in position for molding the pulp, constitute annular grooves for forming the chines upon the inside of the barrel for the retention of the head of the barrel. To provide a neat and close joint between the edges of the inner staves, said edges are beveled, as shown in Figs. 1, 4, and 8, in such way as not to interfere with each other as they are drawn toward the center of the machine or rocked out into operative position. It will be readily understood that the provision made for retracting the staves D toward the center is necessary in the manufacture of vessels having the barrel form or central bulge shown, in order to permit such vessels to be removed after they are completed. A cap or covering plate, K, having an annular portion, K', and a sleeve, $K^2$, is provided, adapted to be applied after the inner staves have been thrown out into position shown in Fig. 2, the annular extension K' serving by its interposition between the staves D to hold them firmly in position, and having also for its purpose the prevention of the escape of any of the pulp. It is held in place by any suitable means, that shown being merely a tapering pin, $k$, passing through shaft $B^2$ and pressing down against said cap-plate. The staves are by preference perforated to allow the escape of the liquid contained in the paper-pulp; but any other means of getting rid of the water or liquid may be employed, according to the desire of the manufacture or the purpose for which the machine is used. The thickness of the body of the barrel may be regulated by the adjustment of the links I, which, as above described, are made extensible.

I am aware that flexible strips have been employed connecting the adjacent edges of the staves, and also that two series of staves have been employed, the edges of one series overlapping and sliding upon the edges of the others for closing the spaces between the same.

Having now described my invention, what I claim as new is—

1. A joint-covering strip, $e^2$, flexibly attached at one edge to the edge of a stave, in combination with and sliding laterally upon the rabbeted edge of the adjacent stave, for the purpose and substantially as described.

2. The combination, with the yielding plate $e^2$, having its outer edge beveled or concave in shape, of the rabbet $e'$ in the adjacent stave for the reception of said plate $e^2$, also having its edge beveled or concave in form, for forming a vertical rib, substantially as described.

3. The combination, with the staves, of feet adapted to slide between ways for guiding the movements of said staves, substantially as described.

4. The combination, with the outer staves, of the vertically-adjustable rings or circular frames surrounding said staves, and the interposed links connecting said rings and staves, substantially as described.

5. The combination, with the staves E, links I, and circular frames F, surrounding said staves, of screws G for operating said circular frames, substantially as described.

6. In a barrel-making machine, the combination, with one or more circular frames for operating the staves, of two or more vertical screws adapted by suitable gearing to be actuated simultaneously and to operate upon said frames for elevating or depressing the latter, substantially as described.

7. The vertically-moving circular frames F, in combination with suitable guide-posts, $F^3$, for steadying and guiding said frames in their vertical movements, substantially as specified.

8. The combination, with the vertical screws G, of the horizontally-rotating spur-wheels H, and a spur-pinion interposed between said spur-wheels and intermeshing with all, substantially as and for the purpose set forth.

9. The inside former composed of a series of staves hinged to the base-plate of the machine, in combination with means for rocking said staves upon their pivots, for the purpose and substantially as described.

10. The hinged staves D, in combination with the links c, and sleeves B′, surrounding the central axis, all connected and operated by means of a lever, for the purpose and substantially as set forth.

11. The combination, with the inner staves, D, and outer staves, E, of a cover, K, of the form and for the purpose substantially as described.

12. The annular flange K′, formed upon the inner side of cover K, substantially as and for the purpose described.

13. The links I, connecting the outer staves with the circular frame F, made adjustable in length for the purpose and substantially as described.

In testimony whereof I have hereunto set my hand this 9th day of June, A. D. 1883.

JOHN F. SEIBERLING.

Witnesses:
H. M. HOUSER,
F. G. STEELE.